United States Patent
Ivezic et al.

(10) Patent No.: US 6,629,004 B1
(45) Date of Patent: Sep. 30, 2003

(54) METHOD FOR AUTOMATICALLY EVALUATING A TRANSITION FROM A BATCH MANUFACTURING TECHNIQUE TO A LEAN MANUFACTURING TECHNIQUE

(75) Inventors: Nenad Ivezic, Bethesda, MD (US); Thomas E. Potok, Oak Ridge, TN (US)

(73) Assignee: Ut-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/399,419

(22) Filed: Sep. 20, 1999

(51) Int. Cl.[7] .............................................. G06F 19/00
(52) U.S. Cl. ........................ 700/97; 700/105; 702/182; 705/7
(58) Field of Search ............................ 700/97, 99, 100, 700/103, 104, 105, 108; 703/6, 13; 705/7, 11; 702/182

(56) References Cited

U.S. PATENT DOCUMENTS

| | | | | |
|---|---|---|---|---|
| 4,604,718 A | * | 8/1986 | Norman et al. ................ | 703/6 |
| 5,724,262 A | * | 3/1998 | Ghahramani ................ | 702/186 |
| 6,058,334 A | * | 5/2000 | Shapiro ........................ | 700/97 |
| 6,198,980 B1 | * | 3/2001 | Costanza .................... | 700/99 |
| 6,259,959 B1 | * | 7/2001 | Martin ........................ | 700/99 |
| 6,381,556 B1 | * | 4/2002 | Kazemi et al. ............. | 702/182 |
| 6,415,196 B1 | * | 7/2002 | Crampton et al. .......... | 700/100 |
| 2002/0026257 A1 | * | 2/2002 | Newmark ................... | 700/108 |

FOREIGN PATENT DOCUMENTS

WO WO/0122271 A2 * 3/2001

OTHER PUBLICATIONS

"Queueing Systems vol. 1: Theory", L. Kleinrock, Jan. 1975.

* cited by examiner

Primary Examiner—Albert W. Paladini
Assistant Examiner—Paul Rodriguez
(74) Attorney, Agent, or Firm—Akerman Senterfitt

(57) ABSTRACT

A method for automatically evaluating a manufacturing technique comprises the steps of: receiving from a user manufacturing process step parameters characterizing a manufacturing process; accepting from the user a selection for an analysis of a particular lean manufacturing technique; automatically compiling process step data for each process step in the manufacturing process; automatically calculating process metrics from a summation of the compiled process step data for each process step; and, presenting the automatically calculated process metrics to the user. A method for evaluating a transition from a batch manufacturing technique to a lean manufacturing technique can comprise the steps of: collecting manufacturing process step characterization parameters; selecting a lean manufacturing technique for analysis; communicating the selected lean manufacturing technique and the manufacturing process step characterization parameters to an automatic manufacturing technique evaluation engine having a mathematical model for generating manufacturing technique evaluation data; and, using the lean manufacturing technique evaluation data to determine whether to transition from an existing manufacturing technique to the selected lean manufacturing technique.

16 Claims, 3 Drawing Sheets

METHOD FOR AUTOMATICALLY EVALUATING A TRANSITION FROM A BATCH MANUFACTURING TECHNIQUE TO A LEAN MANUFACTURING TECHNIQUE

CROSS REFERENCE TO RELATED APPLICATIONS (Not Applicable)

STATEMENT REGARDING FEDERALLY SPONSORED RESEARCH OR DEVELOPMENT

This invention was made with government support under contract DE-AC05-960R22464, awarded by the United States Department of Energy to Lockheed Martin Energy Research Corporation. The United States government has certain rights in this invention.

BACKGROUND OF THE INVENTION

1. Technical Field

This invention relates to the field of manufacturing process transition evaluation and more particularly to a method and apparatus for automatically evaluating a transition from a batch manufacturing technique to a lean manufacturing technique.

2. Description of the Related Art

Historically, the traditional approach to manufacturing process management involved "batch" production. As a consequence of Henry Ford's popularization of mass production techniques during the early twentieth century, batch production techniques have permeated the production world. In one such batch technique, the Push System, upstream assembly line operations can be scheduled according to theoretical downstream assembly line results based on a plan which may not be current. In consequence, the Push System places more parts onto the production floor than is required for production and can lead to a large volume of work-in-process, excessive inventories, significant overhead for tracking parts, large queue areas, and higher costs.

In contrast, the Pull System is a contemporary manufacturing planning system based on communication of actual real-time needs from downstream operations including, ultimately, final assembly or the equivalent. More particularly, the Pull System, a real-time production technique, places material onto the production floor based on the rate of customer demand. The key to the Pull System is to smooth and balance material flows by means of controlled inventories. The Pull System's philosophy focuses upon moving partially-assembled parts throughout the production floor before issuing new parts for a subsequent production run.

Like the Pull System, the Takt System is a real-time production technique which places material onto the production floor based on the rate of customer demand. "Takt" is a German term for rhythm. Specifically, the Takt System centers about the concept of "takt time", the allowable time to produce one product at the rate customers are demanding it. Takt time is not synonymous with cycle time, which is the normal time to complete an operation on a product. Rather, in the Takt System, a common frequency of production is assumed over the whole process.

More recently, one innovative approach has incorporated real time techniques such as the Pull System and Takt System. "Lean" manufacturing has been referred to as the most effective manufacturing system to date. Lean manufacturing has proven critical to increased productivity, inventory reduction, employee involvement and bottom line profits. Specifically, lean manufacturing refers to the Toyota® Production System® and is associated with the word "lean" because "lean" implies doing more with less: less inventory, less waste, less effort to produce more (or less personnel per process), quick changeover and setup time, one-piece flow of the supply chain, and less shop floor space needed. Mass producers who have implemented a lean manufacturing system enjoy a tremendous advantage over their competitors employing mass production manufacturing techniques because lean production is a system operating in "real time."

Lean manufacturing is, in it's most basic form, the systematic elimination of waste, using the concepts of flow and pull in a production system. The touted benefits of lean production systems include 50% lower production costs, 50% less personnel, 50% less time to field new products, higher quality, higher profitability, and higher system flexibility. Just as mass production is recognized as the production system of the 20th century, lean production is viewed as the production system of the 21st century.

Still, transition from traditional to lean manufacturing approaches is a difficult process and requires major capital investment of a manufacturing company. Understanding the impact of changing from a traditional Push System to lean manufacturing incorporating a Pull System or Takt System can be difficult. Typically, specialists having expertise in manufacturing production systems and computer simulation are required to investigate the current state, project the future advanced manufacturing "lean" state, and to predict the performance of that lean setup.

SUMMARY OF THE INVENTION

A method for automatically evaluating a manufacturing technique in accordance with the inventive arrangement satisfies the long-felt need of the prior art by automatically generating evaluation information for choosing whether to transition from a batch manufacturing technique to a lean manufacturing technique. Thus, the inventive arrangements provide a method and apparatus for automatically evaluating a transition from a batch manufacturing technique to a lean manufacturing technique. The inventive arrangements have advantages over all manufacturing technique evaluation methods, and provides a novel and nonobvious automated process for evaluating the transition from traditional batch manufacturing to technically advanced lean manufacturing.

A method for automatically evaluating a manufacturing technique comprises the steps of: receiving from a user manufacturing process step parameters characterizing a manufacturing process; accepting from the user a selection for an analysis of a particular lean manufacturing technique; automatically compiling process step data for each process step in the manufacturing process; automatically calculating process metrics from a summation of the compiled process step data for each process step; and, presenting the automatically calculated process metrics to the user.

Specifically, the accepting step can comprise the step of accepting from the user a selection for an analysis of a particular manufacturing technique selected from the group consisting of a Pull System and a Takt System. Moreover, the automatic compiling step can comprise the steps of: generating a Takt Time for the manufacturing process; determining an optimal number of machines for each process step; computing process step utilization for each process step; estimating process step queue time consistent with the selected manufacturing technique; and, calculating additional process step characterization data including process step span time, process step crew hours, process step machine cost and process step manpower cost.

The automatic calculating step can sum the data automatically compiled in the automatically compilation step, each summation forming the process metrics. More particularly, the automatic calculating step can comprise the steps of: summing each process step queue time estimated for each process step, the summation forming a process queue time; summing each process step span time calculated for each process step, the summation forming a process span time; summing each process step machine cost calculated for each process step, the summation forming a process machine cost; and, summing each process step manpower cost calculated for each process step, the summation forming a process manpower cost.

Finally, the presenting step comprises the step of arranging the automatically calculated process metrics in tabular format. In addition, the presenting step further comprises displaying in a graphical user interface the automatically calculated process metrics arranged in tabular format.

A method for evaluating a transition from a batch manufacturing technique to a lean manufacturing technique can comprise the steps of: collecting manufacturing process step characterization parameters; selecting a lean manufacturing technique for analysis; communicating the selected lean manufacturing technique and the manufacturing process step characterization parameters to an automatic manufacturing technique evaluation engine having a mathematical model for generating manufacturing technique evaluation data; and, using the lean manufacturing technique evaluation data to determine whether to transition from an existing manufacturing technique to the selected lean manufacturing technique.

In particular, the selecting step comprises the step of selecting a lean manufacturing technique for analysis selected from the group consisting of a Pull System and a Takt System. In addition, the communicating step comprises the step of communicating the selected lean manufacturing technique and the manufacturing process step characterization parameters to an automatic manufacturing technique evaluation engine having a mathematical model for generating manufacturing technique evaluation data, the automatic manufacturing technique evaluation engine computing manufacturing technique evaluation data both for a batch manufacturing technique and the selected lean manufacturing technique. Finally, the using step can comprise comparing batch manufacturing technique evaluation data generated by the manufacturing technique evaluation engine with lean manufacturing technique evaluation data generated by the manufacturing technique evaluation engine.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1:
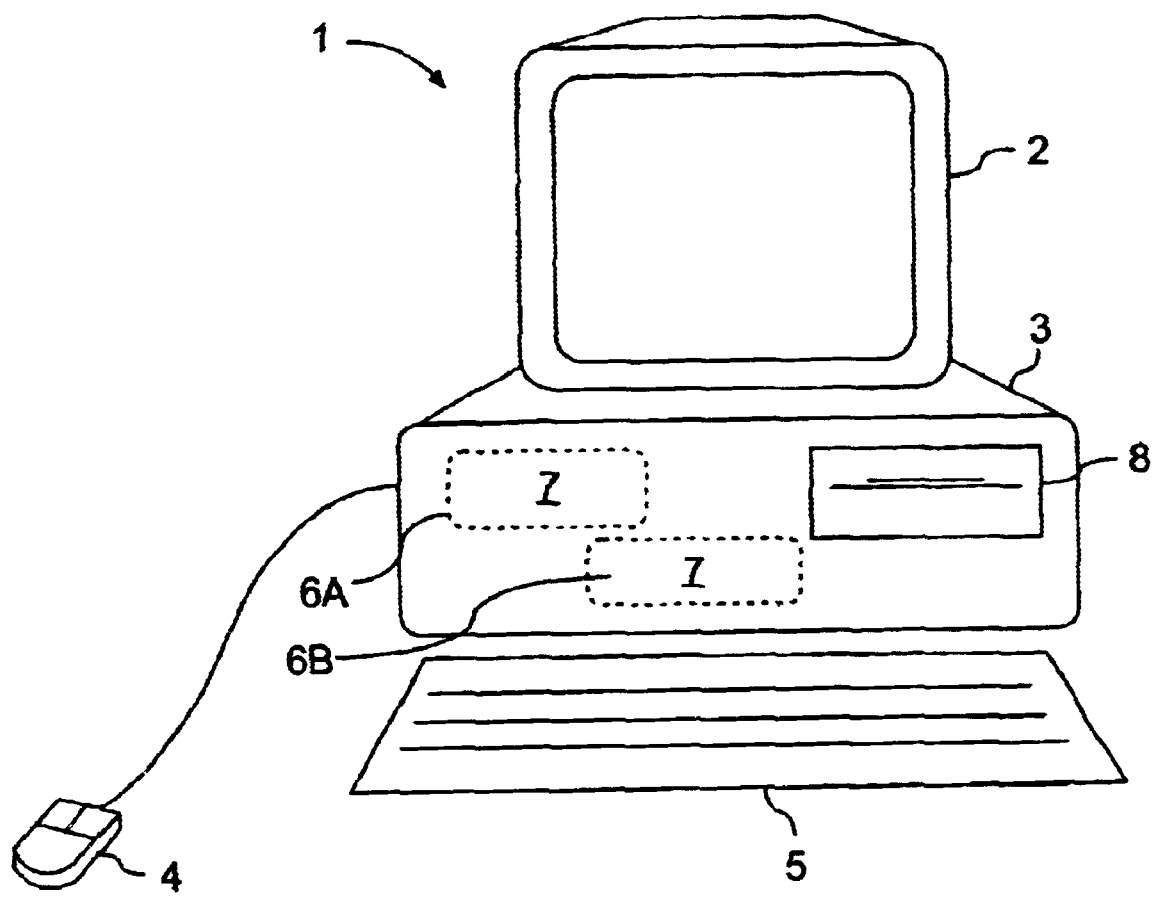
FIG. 1 is a pictorial representation of a computer system with mouse capabilities on which the apparatus of the invention can be used.

FIG. 1 shows a typical computer system 1 for use in conjunction with the present invention. The system preferably comprises a computer 3 having a central processing unit (CPU), fixed disk 6A, internal memory device 6B, and CD-ROM drive 8. The system also includes a keyboard 5, and at least one user interface display unit 2 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation, or any similar microprocessor. An interface device, such as mouse 4, can also be provided with the system, but is not necessary for operation of the invention as described herein. The various hardware requirements for the computer system as described herein can generally be satisfied by any one of many commercially available high speed personal computers offered by manufacturers such as International Business Machines (IBM), Compaq, Hewlett Packard, or Apple Computers.

Figure 2:
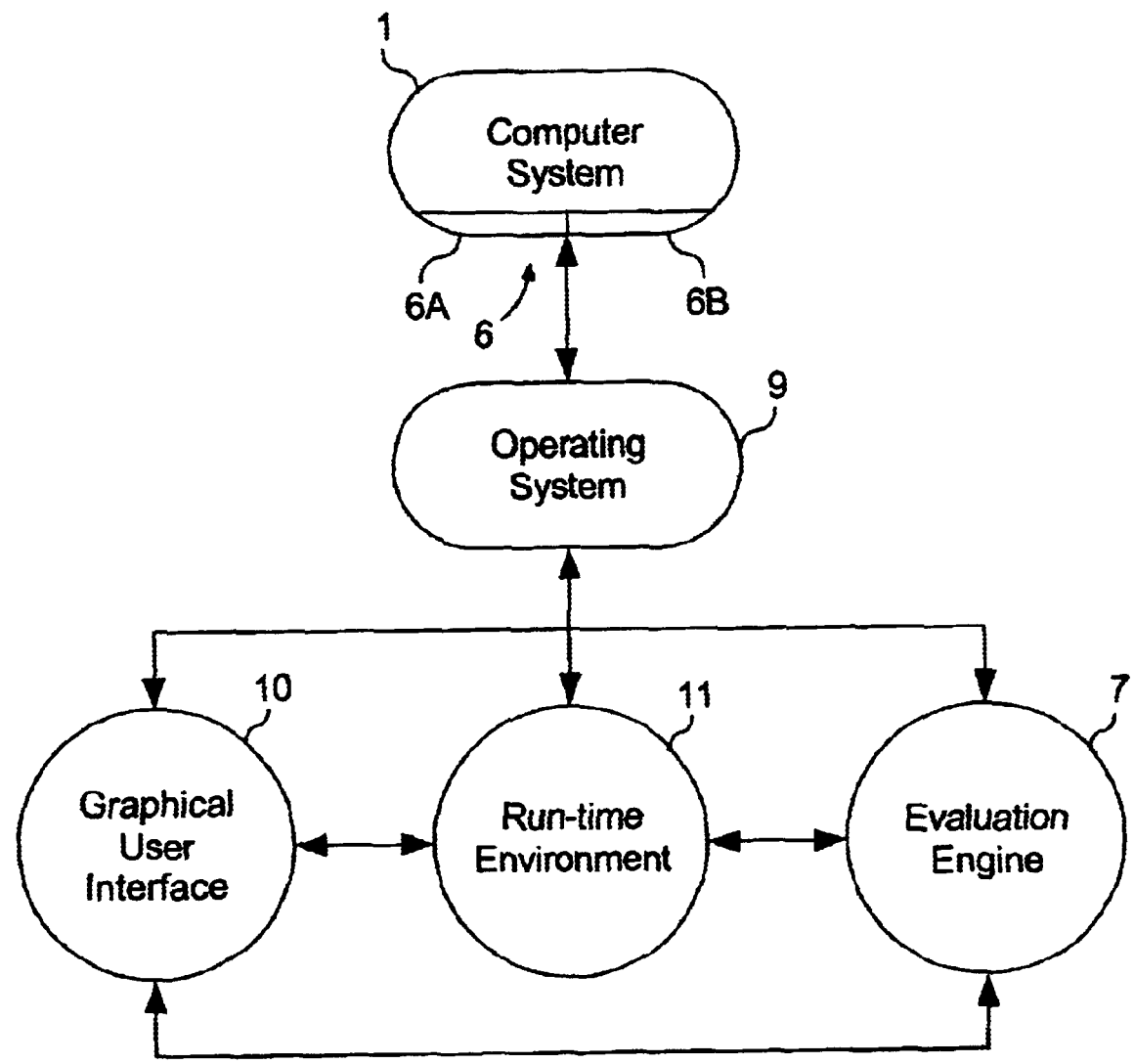
FIG. 2 is a block diagram showing a typical high level architecture for the computer system in FIG. 1.

FIG. 2 illustrates a preferred architecture for an automatic transition evaluation apparatus in computer 1. As shown in FIG. 2, computer system 1 includes one or more computer memory devices 6, preferably an electronic random access memory 6B and a bulk data storage medium, such as a fixed disk drive 6A. In addition, the apparatus can include an operating system 9, a run-time environment 11, an evaluation engine 7 in accordance with the inventive arrangements, and a graphical user interface 10 for displaying output generated by the evaluation engine 7. In FIG. 2, the evaluation engine 7, run-time environment and the graphical user interface 10 are shown as separate application programs. It should be noted, however, that the invention is not limited in this regard, and these various applications could, of course, be implemented as a single, more complex applications program.

In a preferred embodiment described herein, operating system 9 is one of the Windows family of operating systems, such as Windows NT, Windows 95 or Windows 98 which are available from Microsoft Corporation of Redmond, Wash. However, the system is not limited in this regard, and the invention can also be used with any other type of computer operating system, for instance the Linux operation system, freely available from a variety of commercial and non-commercial sources and Web sites. The preferred process preferably can be implemented using the Java® language. In consequence, the source code comprising the inventive apparatus can be compiled using any one of several commercial and non-commercial Java compilers, for instance JDK 1.1.6, freely available from Sun Microsystems and Microsoft Corporation. The resulting Java byte-code can be interpreted by run-time environment 11, for instance the Java Runtime Environment, free available from Sun Microsystems or Microsoft Corporation.

Figure 3:
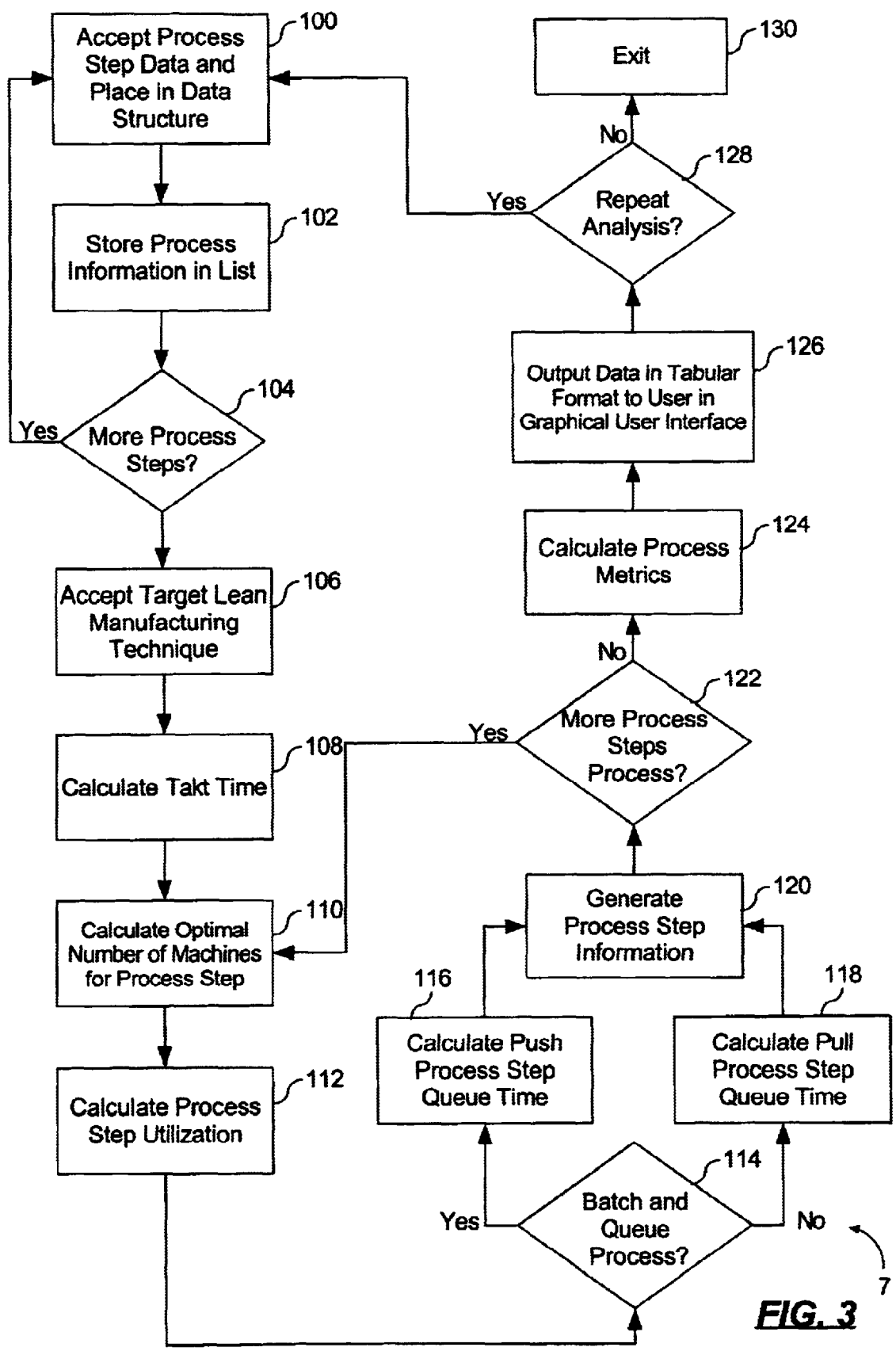
FIG. 3 is a flow chart illustrating a process for automatically evaluating a transition from a batch manufacturing technique to lean manufacturing technique.

FIG. 3 is a flow chart illustrating a process for automatically evaluating a transition from a batch manufacturing technique to lean manufacturing technique. In a typical manufacturing process, material can accumulate in an input queue awaiting processing by a machine used in the manufacturing process. The time spent waiting in the input queue often is referred to as "queue time". When the machine becomes available, the material can move to the machine becoming "work-in-progress". The time spent during machining is referred to as "service time". Upon completion, work-in-progress becomes a "finished part". This finished part subsequently can move to an output queue thus completing the processing of material into a finished part. The overall manufacture of a product may require many process steps. The evaluation of a transition to lean manufacturing requires that information be analyzed both at the process step level, and over the entire process. Minimally, the invention requires the following information about a process step: the process step service time, the number of machines in a process step, the number of people in the crew, the number of finished parts produced in a given time unit, the cost per machine, the utilization threshold, and the cost per unit time of a crew member. Based on this information, a mathematical model is used to generate evaluation information about moving to a lean manufacturing cell.

In the preferred embodiment, aforementioned data common to the manufacturing environment can be gathered by a manufacturing engineer and subsequently provided to the evaluation engine 7. Specifically, in step 100, computer system 1 can receive the data about a manufacturing process step gathered by the manufacturing engineer. Having received the data, in step 102, the computer system 1 can store the information for the process step in a data structure. Moreover, the system 102 can store the data structure in a list of data structures, the aggregation representing the entire manufacturing process. In decision step 104, the computer system 1 can gather manufacturing data pertinent to additional process steps in the manufacturing process. Subsequently, in step 106, the computer system 1 can accept the manufacturing engineers selection for a target lean manufacturing technique. The computer system 1 can provide the list of data structures each having manufacturing process step data to the evaluation engine 7. This engine then produces statistics on what can be expected if the manufacturing process is converted to a lean process.

More particularly, in step 108, the manufacturing process Takt Time can be calculated using the following equation:

$$J = \frac{1}{S}$$

where S is the number of finished parts produced in a given time unit and J is the Takt Time. Notably, the Takt Time is the time period required for a new finished product to exit the manufacturing process.

Using the calculated Takt Time, in step 110, an optimal number of machines required to operate each process step within the utilization threshold can be calculated. Significantly, the evaluation engine 7 can perform the following calculation for each process step in the manufacturing process:

$$y' = \text{Ceiling}\left[\frac{x}{J \times G}\right]$$

where x is the process step service time for the process step under consideration, the process step service time having been provided by the manufacturing engineer in step 100. In addition, J is the Takt Time calculated in step 108, G is the utilization threshold provided by the manufacturing engineer in step 100, and y' is the optimal number of machines required to operate the manufacturing process within the utilization threshold G.

Having calculated optimal number of machines for the particular process step, in step 112 the evaluation engine 7 can calculate the process step utilization ρ for the particular process step. Specifically, ρ can be calculated using the following equation:

$$\rho = \frac{x}{J \times y'}$$

where x is the process step service time for the process step under consideration, the process step service time having been provided by the manufacturing engineer in step 100. In addition, J is the Takt Time calculated in step 108, and y' is the optimal number of machines required to operate the manufacturing process within the utilization threshold G as calculated in step 110.

In decision step 114, the evaluation engine 7 can identify whether in step 106, the manufacturing engineer selected a batch and queue Push System target manufacturing technique or a lean Pull or Takt System target manufacturing technique. If the manufacturing engineer has selected a Push System technique, in step 116, the evaluation engine 7 can calculate the estimated time that a finished part remains waiting in an output queue. Commonly referred to as the "push process step queue time", the evaluation engine 7 can calculate the same using the following equation:

$$w = \frac{x \times \rho}{2 \times (1 - \rho)}$$

where x is the process step service time for the process step under consideration, the process step service time having been provided by the manufacturing engineer in step 100, ρ is the process step utilization for the particular process step calculated in step 112, and w is the push process step queue time.

In contrast, if the manufacturing engineer has selected a Pull or Takt System technique, in step 118, the evaluation engine 7 can calculate the estimated time that a finished part remains waiting in an output queue. Commonly referred to as the "lean process step queue time", the evaluation engine 7 can calculate the same using the following equation:

$$w = (J \times y') - x$$

where x is the process step service time for the process step under consideration, the process step service time having been provided by the manufacturing engineer in step 100, J is the Takt Time calculated in step 108, and y' is the optimal number of machines required to operate the manufacturing process within the utilization threshold G as calculated in step 110.

Regardless of the manufacturing technique, in step 120, the evaluation engine 7 can generate additional process step information for the particular process step. Specifically, the evaluation engine 7 can calculate the process step span time t for the particular process step. The process step span time t is the estimated time taken by an individual part to be processed within the particular process step and can be calculated by the equation t=x+w where x is the process step service time for the process step under consideration, the process step service time having been provided by the manufacturing engineer in step 100, and w is either the push process step queue time or the lean process step queue time, depending upon the manufacturing technique selected by the manufacturing engineer in step 106.

The evaluation engine can further calculate process step crew hours h. Specifically, process step crew hours is the number of hours that a production crew consumes producing a part. Process step crew hours h can be calculated using the equation h=y'+x where x is the process step service time for the process step under consideration, the process step service time having been provided by the manufacturing engineer in step 100, and y' is the optimal number of machines required to operate the manufacturing process within the utilization threshold G.

Additionally, the evaluation engine 7 can calculate process step machine cost r. Specifically, the process step machine cost is the cost of the machine for a particular process step. The process step machine cost r can be calculated using the equation r=y'×m where y' is the optimal number of machines required to operate the manufacturing process within the utilization threshold G as calculated in step 110, and m is the cost per machine for the particular process step as provided by the manufacturing engineer in step 100.

Finally, the evaluation engine 7 can calculate the manpower cost v. Specifically, the manpower cost is the cost of manpower for a particular process step. The manpower cost v can be calculated using the equation v=c×P×t where c is the number of people in a production crew for the particular process step, P is the cost per unit time of a crew member, and t is process step span time calculated for the particular process. Subsequently, in decision step 122 the evaluation engine 7 can repeat each calculation in steps 110 through 120 for each process step in the manufacturing process.

Upon compiling evaluation statistics in steps 110 through 120 for each process step in the manufacturing process, in step 124, the evaluation engine 7 can generate process metrics for the entire manufacturing process. In particular, the evaluation engine 7 can calculate the average machine utilization Γ over the entire manufacturing process using the following equation:

$$\Gamma = \frac{\sum_{1}^{n} \rho}{n}$$

where ρ is the process step utilization for a particular process step calculated in step 112, and n is the number of process steps in the entire manufacturing process. The evaluation engine 7 can further calculate the total queue time for the entire manufacturing process W using the following equation:

$$W = \sum_{1}^{n} w$$

where w is the process step queue time calculated either in step 116 or in step 118, and n is the number of process steps in the entire manufacturing process. The evaluation engine 7 can further calculate the total span time for the entire manufacturing process T using the following equation:

$$T = \sum_{1}^{n} t$$

where t is the process step span time calculated either in step 120, and n is the number of process steps in the entire manufacturing process. The evaluation engine 7 can further calculate the total machine cost for the entire manufacturing process R using the following equation:

$$R = \sum_{1}^{n} r$$

where r is the process step span time calculated either in step 120, and n is the number of process steps in the entire manufacturing process. Finally, the evaluation engine 7 can calculate the total manpower cost for the entire manufacturing process V using the following equation:

$$V = \sum_{1}^{n} v$$

where v is the process step manpower cost calculated either in step 120, and n is the number of process steps in the entire manufacturing process.

Ultimately, in step 126, the results of analysis performed by the evaluation engine 7 can be presented in table format in the graphical user interface 10. By presenting the analysis results in a table, the manufacturing engineer can investigate the value of converting a manufacturing line from a batch and queue Push System to a Lean System, for instance a Pull System manufacturing technique. Subsequently, prior to exiting in step 130, in step 128, the manufacturing engineer can modify the manufacturing data provided in step 100 to further evaluate the effect of changes to a Lean System. Thus, the inventive method and corresponding apparatus provide a method of investigating the current state, projecting a future advanced manufacturing "lean" state, and predicting the performance of that lean setup without the necessity of specialists having expertise in manufacturing production systems and computer simulation

What is claimed is:

1. A method for automatically evaluating a manufacturing technique comprising the steps of:
   receiving from a user manufacturing process step parameters characterizing a batch manufacturing process;
   accepting from said user a selection for an analysis of a particular lean manufacturing technique from at least two different lean manufacturing technique options;
   automatically compiling process step data corresponding to said selected lean manufacturing technique for each process step in said manufacturing process;
   automatically calculating process metrics for said selected lean manufacturing technique from a summation of said compiled process step data for each process step; and,
   presenting said automatically calculated process metrics to said user.

2. The method according to claim 1, wherein said presenting step comprises the step of arranging said automatically calculated process metrics in tabular format.

3. The method according to claim 2, wherein said presenting step further comprises displaying in a graphical user interface said automatically calculated process metrics arranged in tabular format.

4. A method for automatically evaluating a manufacturing technique comprising the steps of:
   receiving from a user manufacturing process step parameters characterizing a manufacturing process;
   accepting from said user a selection for an analysis of a particular lean manufacturing technique selected from the group consisting of a Pull System and a Takt System;

automatically compiling process step data for each process step in said manufacturing process;

automatically calculating process metrics from a summation of said compiled process step data for each process step; and, presenting said automatically calculated process metrics to said user.

5. A method for automatically evaluating a manufacturing technique comprising the steps of:

receiving from a user manufacturing process step parameters characterizing a manufacturing process;

accepting from said user a selection for an analysis of a particular lean manufacturing technique;

automatically compiling process step data for each process step in said manufacturing process comprising generating a Takt Time for said manufacturing process, determining an optimal number of machines for each said process step, computing process step utilization for each said process step, estimating process step queue time consistent with said selected lean manufacturing technique, and calculating additional process step characterization data including process step span time, process step crew hours, process step machine cost and process step manpower cost;

automatically calculating process metrics from a summation of said compiled process step data for each process step; and, presenting said automatically calculated process metrics to said user.

6. A method for automatically evaluating a manufacturing technique comprising the steps of:

receiving from a user manufacturing process step parameters characterizing a manufacturing process;

accepting from said user a selection for an analysis of a particular lean manufacturing technique;

automatically compiling process step data for each process step in said manufacturing process, wherein said step of automatically compiling comprises generating a Takt Time for said manufacturing process, determining an optimal number of machines for each said process step, computing process step utilization for each said process step, estimating process step queue time consistent with said selected lean manufacturing technique, and calculating additional process step characterization data including process step span time, process step crew hours, process step machine cost and process step manpower cost;

automatically calculating process metrics from a summation of said compiled process step data for each process step, wherein said step of automatically calculating process metrics comprises summing each said process step queue time estimated for each said process step, said summation of each said process step queue time estimated for each said process step forming a process queue time, summing each said process step span time calculated for each said process step, said summation of each said process step span time calculated for each said process step forming a process span time, summing each said process step machine cost calculated for each said process step, said summation of each said process step machine cost calculated for each said process step forming a process machine cost, and summing each said process step manpower cost calculated for each said process step, said summation of each said process step manpower cost calculated for each said process step forming a process manpower cost; and, presenting said automatically calculated process metrics to said user.

7. A method for evaluating a transition from a batch manufacturing technique to a lean manufacturing technique comprising the steps of:

collecting manufacturing process step characterization parameters;

selecting a lean manufacturing technique for analysis;

communicating said selected lean manufacturing technique and said manufacturing process step characterization parameters to an automatic manufacturing technique evaluation engine having a mathematical model for generating lean manufacturing technique evaluation data; and, using said lean manufacturing technique evaluation data to determine whether to transition from an existing manufacturing technique to said selected lean manufacturing technique.

8. The method according to claim 7, wherein the selecting step comprises the step of selecting a lean manufacturing technique for analysis selected from the group consisting of a Pull System and a Takt System.

9. The method according to claim 7, wherein the communicating step comprises the step of communicating said selected lean manufacturing technique and said manufacturing process step characterization parameters to an automatic manufacturing technique evaluation engine having a mathematical model for generating manufacturing technique evaluation data, said automatic manufacturing technique evaluation engine computing manufacturing technique evaluation data both for a batch manufacturing technique and said selected lean manufacturing technique.

10. The method according to claim 9, wherein the using step comprises comparing batch manufacturing technique evaluation data generated by said manufacturing technique evaluation engine with lean manufacturing technique evaluation data generated by said manufacturing technique evaluation engine.

11. A computer apparatus programmed with a routine set of instructions stored in a fixed medium, the computer apparatus comprising:

means for receiving from a user manufacturing process step parameters characterizing a batch manufacturing process;

means for accepting from said user a selection for an analysis of a particular lean manufacturing technique from at least two different lean manufacturing technique options;

means for automatically compiling process step data corresponding to said selected lean manufacturing technique for each process step in said manufacturing process;

means for automatically calculating process metrics for said selected lean manufacturing technique from a summation of said compiled process step data for each process step; and, means for presenting said automatically calculated process metrics to said user.

12. The computer apparatus according to claim 11, wherein the presenting means comprises means for arranging said automatically calculated process metrics in tabular format.

13. The computer apparatus according to claim 12, wherein said presenting means further comprises means for displaying in a graphical user interface said automatically calculated process metrics arranged in tabular format.

14. A computer apparatus programmed with a routine set of instructions stored in a fixed medium, the computer apparatus comprising:

means for receiving from a user manufacturing process step parameters characterizing a manufacturing process;

means for accepting from said user a selection for an analysis of a particular lean manufacturing technique selected from the group consisting of a Pull System and a Takt System;

means for automatically compiling process step data for each process step in said manufacturing process;

means for automatically calculating process metrics from a summation of said compiled process step data for each process step; and, means for presenting said automatically calculated process metrics to said user.

15. A computer apparatus programmed with a routine set of instructions stored in a fixed medium, the computer apparatus comprising:

means for receiving from a user manufacturing process step parameters characterizing a manufacturing process;

means for accepting from said user a selection for an analysis of a particular lean manufacturing technique;

means for automatically compiling process step data for each process step in said manufacturing process, wherein said means for automatically compiling process step data comprise means for generating a Takt Time for said manufacturing process, means for determining an optimal number of machines for each said process step, means for computing process step utilization for each said process step, means for estimating process step queue time consistent with said selected lean manufacturing technique, and means for calculating additional process step characterization data including process step span time, process step crew hours, process step machine cost and process step manpower cost;

means for automatically calculating process metrics from a summation of said compiled process step data for each process step; and, means for presenting said automatically calculated process metrics to said user.

16. A computer apparatus programmed with a routine set of instructions stored in a fixed medium, the computer apparatus comprising:

means for receiving from a user manufacturing process step parameters characterizing a manufacturing process;

means for accepting from said user a selection for an analysis of a particular lean manufacturing technique;

means for automatically compiling process step data for each process step in said manufacturing process, wherein said means for automatically compiling process step data comprise means for generating a Takt Time for said manufacturing process, means for determining an optimal number of machines for each said process step, means for computing process step utilization for each said process step, means for estimating process step queue time consistent with said selected lean manufacturing technique, and means for calculating additional process step characterization data including process step span time, process step crew hours, process step machine cost and process step manpower cost;

means for automatically calculating process metrics from a summation of said compiled process step data for each process step, wherein said means for automatically calculating process metrics comprise means for summing each said process step queue time estimated for each said process step, said summation of each said process step queue time estimated for each said process step forming a process queue time, means for summing each said process step span time calculated for each said process step, said summation of each said process step span time calculated for each said process step forming a process span time, means for summing each said process step machine cost calculated for each said process step, said summation of each said process step machine cost calculated for each said process step forming a process machine cost, and means for summing each said process step manpower cost calculated for each said process step, said summation of each said process step manpower cost calculated for each said process step forming a process manpower cost; and, means for presenting said automatically calculated process metrics to said user.

\* \* \* \* \*